United States Patent
Miyanabe et al.

(10) Patent No.: US 6,674,695 B1
(45) Date of Patent: Jan. 6, 2004

(54) TRACKING CONTROLLER FOR RECORDING TRACK OF NARROW TRACK PITCH

(75) Inventors: Shogo Miyanabe, Tsurugashima (JP); Hiroki Kuribayashi, Tsurugashima (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/270,657

(22) Filed: Mar. 16, 1999

(30) Foreign Application Priority Data

Mar. 17, 1998 (JP) .......................................... 10-067461

(51) Int. Cl.[7] ................................................ G11B 7/00
(52) U.S. Cl. .............................. 369/44.32; 369/44.28; 369/44.42
(58) Field of Search .......................... 369/44.26, 44.27, 369/44.28, 44.32, 44.29, 44.42, 44.34, 44.35

(56) References Cited

U.S. PATENT DOCUMENTS 5,835,467 A * 11/1998 Tomita et al. ................ 369/48
5,881,039 A * 3/1999 Sano et al. ................... 369/48

* cited by examiner

Primary Examiner—Nabil Hindi
(74) Attorney, Agent, or Firm—Morgan, Lewis & Bockius LLP

(57) ABSTRACT

A tracking controller capable of conducting a correct tracking control even if a recording track is formed with a narrow track pitch on a recording disk. The tracking controller calculates an error value between a read signal read from a recording track intended for reading and a predetermined value, a first coefficient from a correlation between a read signal read from a recording track adjacent to the recording track intended for reading on the inner peripheral side of the disk and the error value, and a second coefficient from a correlation between a read signal read a recording track adjacent to the recording track intended for reading on the outer peripheral side of the disk and the error value. A difference between the first and second coefficients is calculated as a tracking offset which is subtracted from a tracking error to correct a tracking offset.

5 Claims, 5 Drawing Sheets

TRACKING CONTROLLER FOR RECORDING TRACK OF NARROW TRACK PITCH

BACKGROUND OF THE INVENTION

1. Field of the Invention

The present invention relates to a tracking controller for use in a recorded information reproducing apparatus for reading recorded information from a recording track formed on a recording medium.

2. Description of Related Art

For correctly reading recorded information from an optical disk as a recording medium, tracking control techniques are indispensable for controlling an information recording beam to follow a recording track formed on a recording surface of the optical disk.

In such a tracking control, two light detectors are disposed symmetrically to the center of the recording track for receiving reflected light when the information reading beam is irradiated to the recording disk. Then, a difference in opto-electrically transduced outputs between the two light detectors is calculated as a tracking error signal, and the position at which the information reading beam should be irradiated is adjusted to converge the signal level of the tracking error signal to "0."

However, as the distance between respective recording tracks, i.e., a so-called track pitch is narrower for realizing higher density recording, the read signals are adversely affected by crosstalk from adjacent tracks, resulting in offset components superimposed on the tracking error signal. The offset components superimposed on the tracking error signal makes a smaller level difference between the tracking error signal produced when the information reading beam is in an on-track state and the tracking error signal produced when the information reading beam is in an off-track state, thereby causing a problem that a correct tracking control is prevented.

OBJECT AND SUMMARY OF THE INVENTION

The present invention has been made for solving the problem mentioned above, and its object is to provide a tracking controller which is capable of conducting a correct tracking control even if recording tracks are formed with a narrow track pitch on a recording disk.

A tracking controller according to the present invention is intended for use in a recorded information reproducing apparatus having tracking error detecting means for detecting a tracking error based on a read signal produced by opto-electrically transducing reflected light when an information reading beam is irradiated to a recording disk, and a tracking actuator for forcing the information reading beam to follow a recording track on the recording disk based on the tracking error. The tracking controller comprises error detecting means for calculating an error value between a read signal read from a recording track intended for reading and a predetermined value, coefficient calculating means for calculating a first coefficient according to a correlation between a first read signal read from a first adjacent recording track adjacent to the recording track intended for reading on the inner peripheral side of the disk and the error value, and for calculating a second coefficient according to a correlation between a second read signal read from a second adjacent recording track adjacent to the recording track intended for reading on the outer peripheral side of the disk and the error value, and means for calculating a difference value between the first coefficient and the second coefficient as a tracking offset, and subtracting the tracking offset from the tracking error to correct the tracking offset.

DETAILED DESCRIPTION OF THE PREFERRED EMBODIMENTS

The present invention will hereinafter be described in conjunction with its embodiments.

Figure 1:
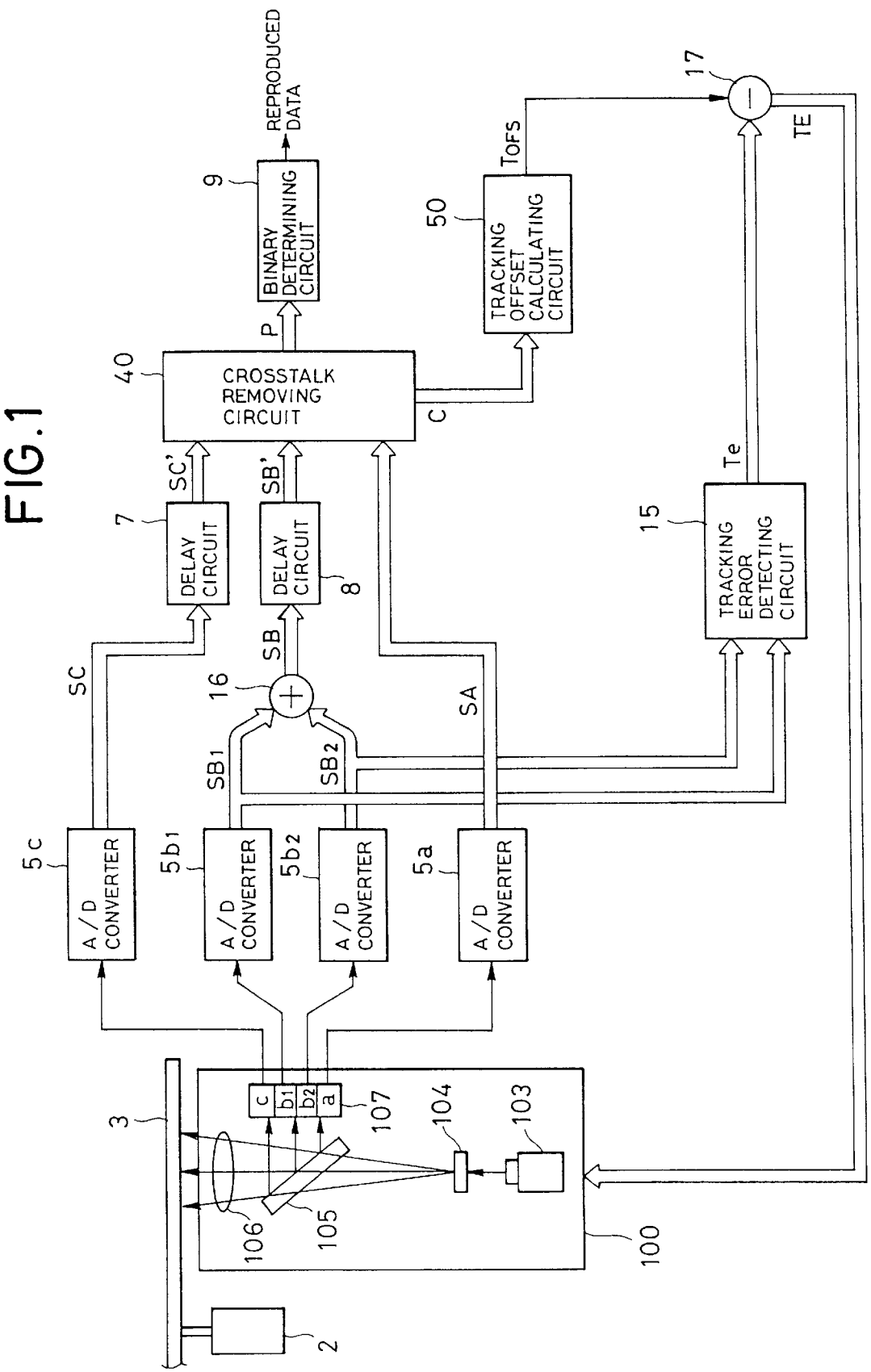
FIG. 1 is a block diagram illustrating the configuration of a recorded information reproducing apparatus comprising a tracking controller according to the present invention.

FIG. 1 illustrates the configuration of a recorded information reproducing apparatus which comprises a tracking controller according to the present invention.

Referring specifically to FIG. 1, a laser beam emitted from a laser oscillator 103 mounted on a pickup 100, serving as information reading means, is split into three information reading beams through a grating 104. These three information reading beams are irradiated to a recording surface of a recording disk 3 through a half mirror 105 and an objective lens 106. Each of the three information reading beams is irradiated to a corresponding one of three recording tracks positioned adjacent to each other on the recording surface of the recording disk 3.

Figure 2:
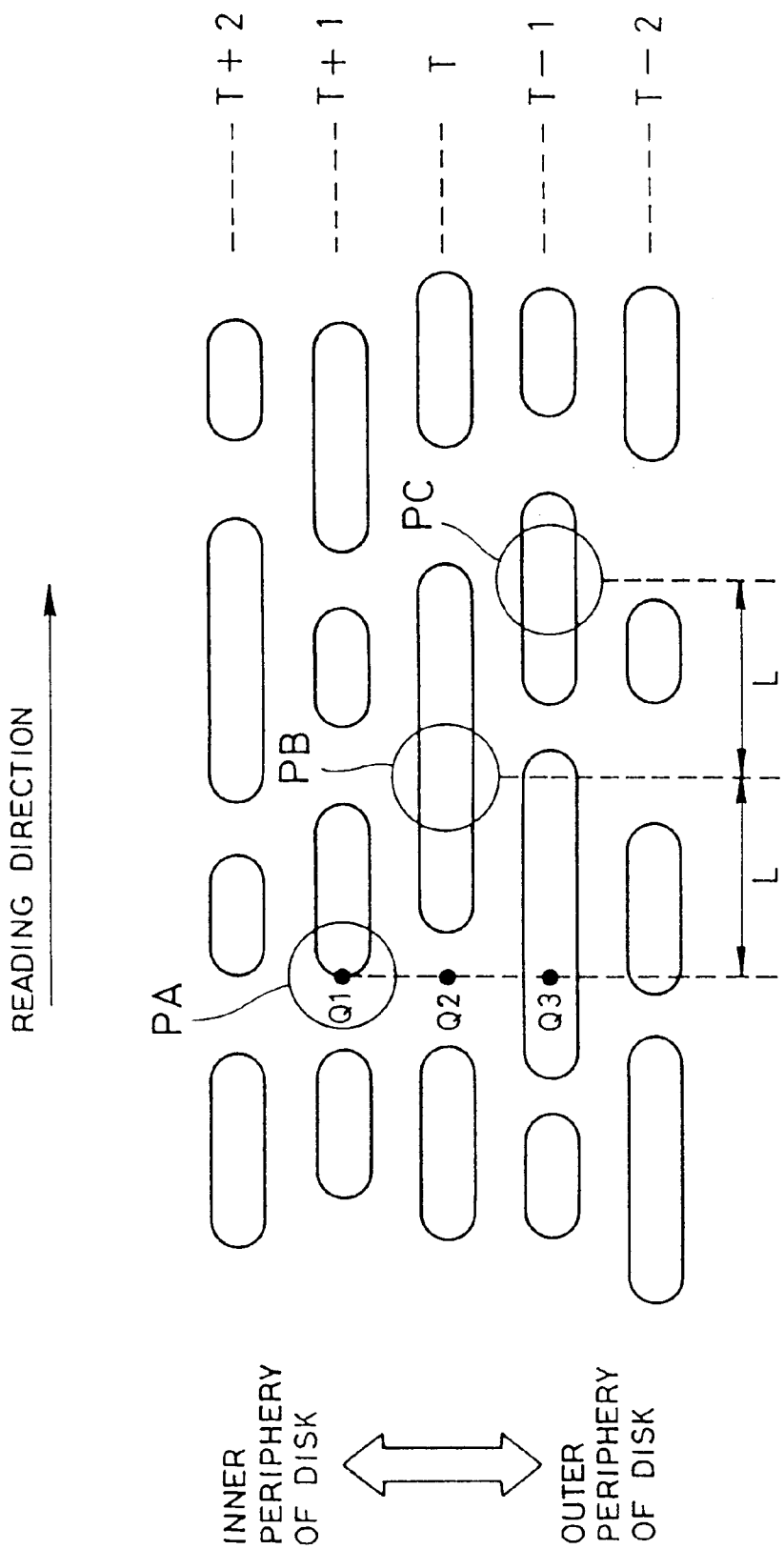
FIG. 2 is a diagram showing a positional relationship between beam spots PA–PC and respective recording tracks on a recording disk 3.

By irradiating the three information reading beams to the three adjacent recording tracks, beam spots PA–PC are formed on recording tracks (T+1), T, (T−1), positioned adjacent to each other on the recording disk 3, respectively, for example as illustrated in FIG. 2. In this event, the beam spots PA, PB are spaced by a distance L in a reading direction, while the beam spots PB, PC are also spaced by the distance L in the reading direction, as illustrated in FIG. 2.

Reflected light produced by each of the beam spots PA, PB, PC is irradiated to a light detecting unit 107 through an objective lens 106 and a half mirror 105. The light detecting unit 107 is composed of light detectors 107a–107c independent of each other.

The light detector 107a supplies an A/D converter 5a with a read signal produced by opto-electrically transducing reflected light by the beam spot PA supplied thereto through the half mirror 105. Light detectors $107b_1$, $107b_2$ are disposed symmetrically to the center of the recording track, and supply corresponding A/D converters $5b_1$, $5b_2$ with a read signal produced by opto-electrically transducing reflected light by the beam spot PB. The light detector 107 supplies an A/D converter 5c with a read signal produced by opto-electrically transducing reflected light by the beam spot PC.

It is assumed that the recording surface of the recording disk 3 has been previously maintained in a parallel relationship with the pickup 100 by means (not shown) for correcting a tilt, so that the three information reading beams from the pickup 100 are irradiated perpendicularly to the recording surface.

The A/D converters 5a, 5$b_1$, 5$b_2$, 5c respectively sample the read signals read by the associated reading means a–c in sequence to produce read sample value sequences SA, $SB_1$, $SB_2$, SC, respectively.

The tracking error detecting circuit 15 calculates a difference between the read sample value sequence $SB_1$ and the read sample value sequence $SB_2$, and supplies a subtractor 17 with the difference as a tracking error signal $T_e$. It should be noted that a method of generating such a tracking error signal is not limited to the foregoing, and another tracking error detecting means such as, for example, a phase difference detecting method or the like may be employed.

A delay circuit 7 delays the read sample value sequence SC by a time 2(L/V) to produce a delayed read sample value sequence SC' which is supplied to a crosstalk removing circuit 40. An adder 16 adds the read sample value sequences $SB_1$, $SB_2$ to produce a read sample value sequence SB. A delay circuit 8 delays the read sample value sequence SB by a time (L/V) to produce a delayed read sample value sequence SB' which is supplied to the crosstalk removing circuit 40. In this event, the read sample value sequence SA output from the A/D converter 5a is directly supplied to the cross-talk removing circuit 40. For reference, "L" is the distance between the beam spots PB and PC (PA) as illustrated in FIG. 2, while "V" is a line velocity at which the pickup 100 reads the recording disk 3.

As such, when the read sample value sequence SA is a value produced when the pickup 100 reads at a position $Q_1$ on the recording track (T+1) as illustrated in FIG. 2, the delayed read sample value sequence SB' is a value produced when the pickup reads at a position $Q_2$ on the recording track T. Also, in this event, the delayed read sample value sequence SC' is a value produced when the pickup 100 reads at a position $Q_3$ on the recording track (T−1). It should be noted that the positions $Q_1$–$Q_3$ exist on the same radial line of the recording disk 3, as illustrated in FIG. 2. In other words, the crosstalk removing circuit 40 is supplied with three different read sample value sequences (SA, SB', SC') read from the respective positions existing on the same radial line on the three adjacent recording tracks.

The crosstalk removing circuit 40 removes crosstalk components from each of the adjacent tracks (recording tracks (T+1), (T−1)) inevitably superimposed on the delayed read sample value sequence SB', based on the read sample value sequence SA and the delayed read sample value sequence SC' to produce a crosstalk free read sample value sequence P. A binary determining circuit 9 produces binary reproduced data based on this crosstalk free read sample value sequence P.

Figure 3:
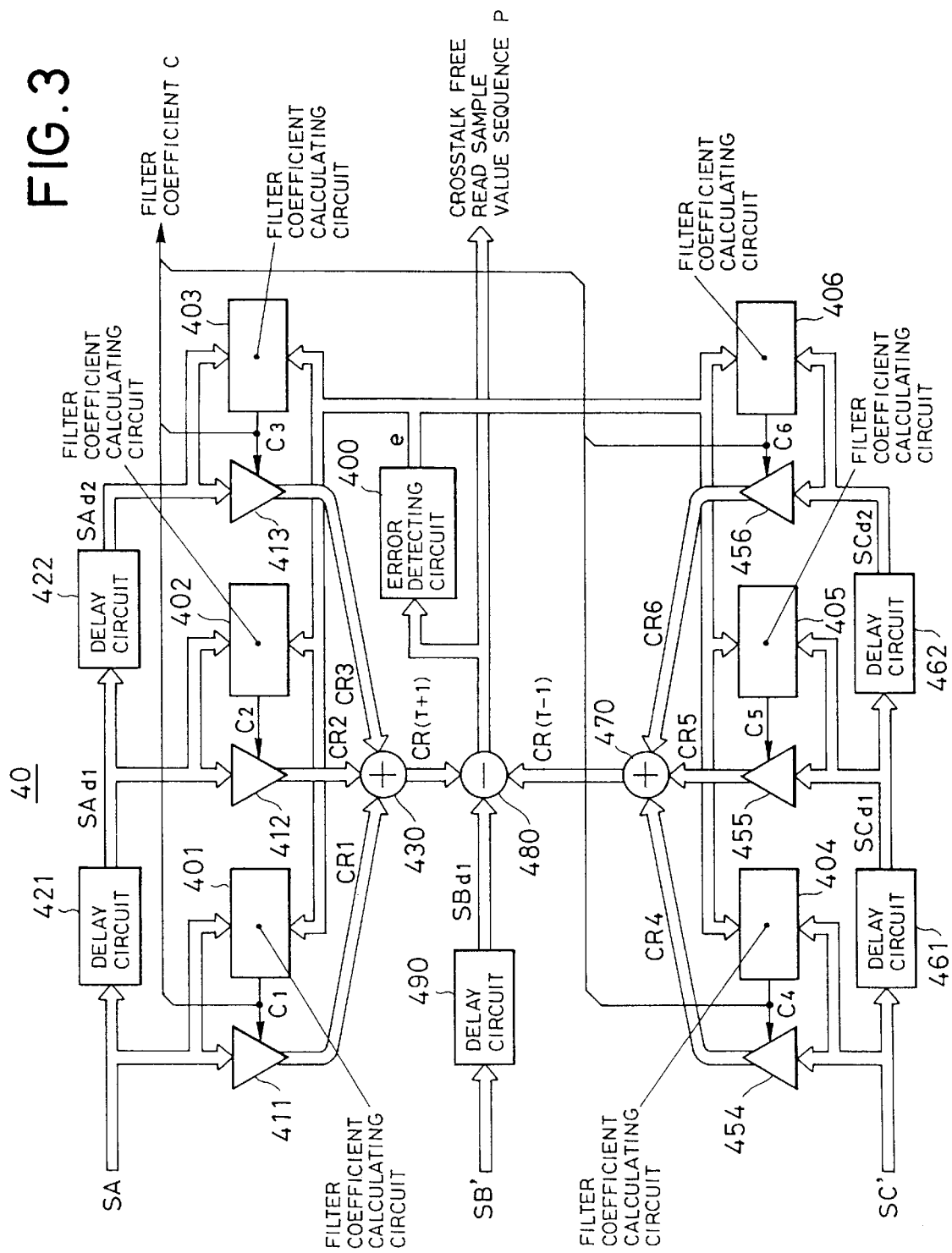
FIG. 3 is a block diagram illustrating the internal configuration of a cross-talk removing circuit 40.

FIG. 3 illustrates the internal configuration of the crosstalk removing circuit 40.

The crosstalk removing circuit 40 illustrated in FIG. 3 applies adaptive signal processing based on an adaptive algorithm such as, for example, an LMS (least mean square) algorithm to the respective read sample value sequences read from the three recording tracks (T+1), T, (T−1) adjacent to each other on the recording disk 3, respectively, to produce a read sample value sequence P from which the crosstalk has been removed.

Referring specifically to FIG. 3, a filter coefficient calculating circuit 401 calculates a filter coefficient $C_1$ based on the read sample value sequence SA and an error value e supplied thereto from an error detecting circuit 400, later described. A coefficient multiplier 411 multiplies each of read sample values in the read sample value sequence SA by the filter coefficient $C_1$ to derive a multiplication result as a crosstalk CR1 which is supplied to an adder 430. A delay circuit 421 delays the read sample value sequence SA by a predetermined time t (later described) to produce a delayed read sample value sequence $SA_{d1}$ which is supplied to a filter coefficient calculating circuit 402, a coefficient multiplier 412 and a delay circuit 422, respectively.

The filter coefficient calculating circuit 402 calculates a filter coefficient $C_2$ based on the delayed read sample value sequence $SA_{d1}$ and the error value e supplied thereto from the error detecting circuit 400. The coefficient multiplier 412 multiplies each of read sample values in the delayed read sample value sequence $SA_{d1}$ by the filter coefficient $C_2$ to derive a multiplication result as a crosstalk CR2 which is supplied to the adder 430. The delay circuit 422 delays the delayed read sample value sequence $SA_{d1}$ further by the predetermined time t to produce a delayed read sample value sequence $SA_{d2}$ which is supplied to a filter coefficient calculating circuit 403 and a coefficient multiplier 413, respectively.

The filter coefficient calculating circuit 403 calculates a filter coefficient $C_3$ based on the delayed read sample value sequence $SA_{d2}$ and the error value e supplied thereto from the error detecting circuit 400. The coefficient multiplier 413 multiplies each of read sample values in the delayed read sample value sequence $SA_{d2}$ by the filter coefficient $C_3$ to derive a multiplication result as a crosstalk CR3 which is supplied to the adder 430. The adder 430 adds the crosstalks CR1–CR3 to produce a total crosstalk $CR_{(T+1)}$ from the recording track (T+1) to the recording track T as illustrated in FIG. 2, and supplies the total crosstalk $CR_{(T+1)}$ to the subtractor 480.

The filter coefficient calculating circuit 404 calculates a filter coefficient $C_4$ based on the delayed read sample value sequence SC' and the error value e supplied thereto from the error detecting circuit 400. The coefficient multiplier 454 multiplies each of read sample values in the delayed read sample value sequence SC' by the filter coefficient C4 to derive a multiplication result as a crosstalk CR4 which is supplied to an adder 470. A delay circuit 461 delays the delayed read sample value sequence SC' by the predetermined time t to produce a delayed read sample value sequence $SC_{d1}$ which is supplied to a filter coefficient calculating circuit 405, a coefficient multiplier 455 and a delay circuit 462, respectively.

The filter coefficient calculating circuit 405 calculates a filter coefficient $C_5$ based on the delayed read sample value sequence $SC_{d1}$ and the error value e supplied thereto from the error detecting circuit 400. The coefficient multiplier 455 multiplies each of read sample values in the delayed read sample value sequence SCdl by the coefficient $C_5$ to produce a multiplication result as a crosstalk CR5 which is supplied to the adder 470. The delay circuit 462 delays the delayed read sample value sequence $SC_{d1}$ further by the predetermined time t to produce a delayed read sample value sequence $SC_{d2}$ which is supplied to a filter coefficient calculating circuit 406 and a coefficient multiplier 456, respectively.

The filter coefficient calculating circuit 406 calculates a filter coefficient $C_6$ based on the delayed read sample value sequence $SC_{d2}$ and the error value e supplied thereto from the error detecting circuit 400. The coefficient multiplier 456 multiplies each of read sample values in the delayed read sample value sequence $SC_{d2}$ by the filter coefficient $C_6$ to produce a multiplication result as a crosstalk CR6 which is supplied to the adder 470. The adder 470 adds the crosstalks CR4–CR6 to produce a total crosstalk $CR_{(T-1)}$ from the recording track (T−1) to the recording track T as illustrated in FIG. 2, and supplies the total crosstalk $CR_{(T-1)}$ to the substractor 480. A delay circuit 490 delays the delayed read sample value sequence SB' further by the predetermined time t to produce a delayed read sample value sequence $SB_{d1}$ which is supplied to the subtractor 480.

The subtractor 480 subtracts each of the total crosstalk $CR_{(T+1)}$ and the total crosstalk $CR_{(T-1)}$ from the delayed read sample value sequence $SB_{d1}$ to output the differences as a crosstalk free read sample value sequence P.

The error detecting circuit 400 detects an error between each of read sample values in the crosstalk free read sample value sequence P and an ideal sample value which can be taken as the read sample value, and supplies each of the filter coefficient calculating circuits 401–406 with the detected error as the error value e as mentioned above. For example, the error detecting circuit 400 extracts a central sample of three successive read sample values in the crosstalk free read sample value sequence P when the values transition from a positive domain to a negative domain or from the negative domain to the positive domain, i.e. a zero cross sample, and takes the zero cross sample as the error value e for an actual "0" value. In this event, the filter coefficient calculating circuits 401–406 update the respective filter coefficients $C_1$–$C_6$ such that the error value e converges to "0."

Figure 4:
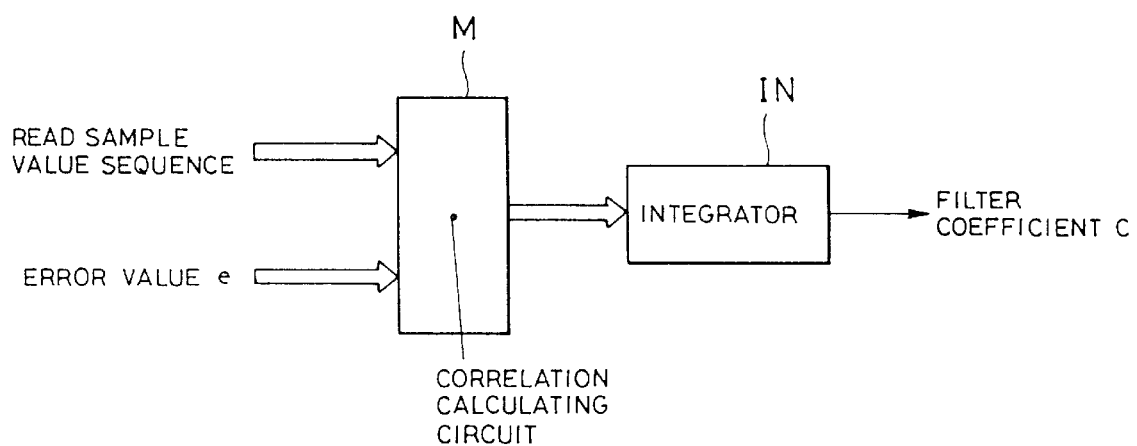
FIG. 4 is a block diagram illustrating an exemplary internal configuration of each of filter coefficient calculating circuits 401–406.

The filter coefficient calculating circuits 401–406 have the same internal configuration which is illustrated in FIG. 4.

Referring specifically to FIG. 4, a correlation calculating circuit M calculates the correlation between the read sample value sequences (SA, $SA_{d1}$, $SA_{d2}$, SC', $SC_{d1}$, $SC_{d2}$) and the error value e, and supplies a correlated value corresponding to the correlation to an integrator IN. The correlation calculating circuit M, for example, multiplies a read sample value sequence by the error value e to derive a correlated value corresponding to the correlation between the two. The integrator IN integrates the correlated value, and outputs the integration result as a filter coefficient C. For example, the filter coefficient calculating circuit 401 calculates the correlation and the read sample value sequence SA and the error value e, integrates and averages correlated values corresponding to this correlation, and outputs the resulting value as the filter coefficient $C_1$.

Figure 5:
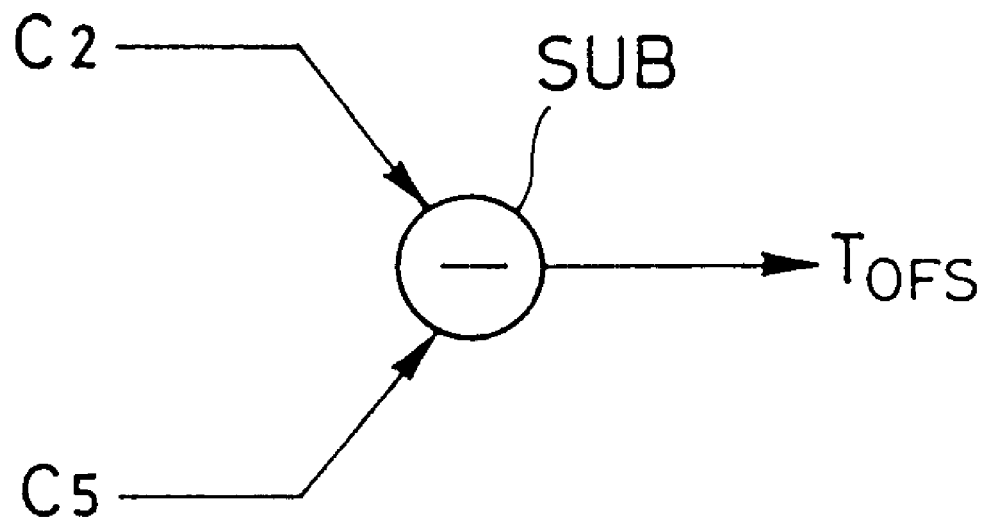
FIG. 5 is a schematic circuit diagram illustrating the internal configuration of a tracking offset calculating circuit 50.

A tracking offset calculating circuit 50 illustrated in FIG. 1, which comprises a subtractor SUB, for example, as illustrated in FIG. 5, executes the following calculation using the filter coefficients $C_2$, $C_5$ generated in the crosstalk removing circuit 40 to derive a tracking offset signal $T_{OFS}$:

$$T_{OFS} = C_2 - C_5$$

Stated another way, the tracking offset calculating circuit 50 calculates the tracking offset signal $T_{OFS}$ indicative of how much tracking offset has occurred in which direction, i.e., toward the inner periphery or the outer periphery of the disk, based on the difference between the filter coefficient $C_2$ generated to remove a crosstalk component from the recording track (T+1) adjacent to the recording track T intended for reading on the inner peripheral side, and the filter coefficient $C_5$ generated to remove a crosstalk component from the recording track (T−1) adjacent to the recording track T on the outer peripheral side.

The subtractor 17 subtracts the tracking offset signal $T_{OFS}$ from the tracking error signal $T_e$ as mentioned above to produce a tracking error signal TE which has been corrected for the tracking offset, and supplies the tracking error signal TE to the pickup 100. A tracking actuator in the pickup 100 displaces the irradiating direction of each of the information reading beams in the radial direction of the disk by an amount corresponding to the tracking error signal TE. As described above, the present invention calculates a tracking offset based on the difference in magnitude between the first filter coefficient $C_2$ produced from the correlation between an error value in a read signal read from a recording track intended for reading and a read signal read from a recording track adjacent to the read recording track on the inner peripheral side of the disk, and the second filter coefficient $C_5$ produced from the correlation between the error value and a read signal read from a recording track adjacent to the read recording track on the outer peripheral side of the disk.

It is therefore possible to conduct a satisfactory tracking control by subtracting tracking offset components from the tracking error signal to remove the offset components superimposed on the tracking error signal, even if a recording track is formed with a narrow track pitch on the recording track.

What is claimed is:

1. A tracking controller in a recorded information reproducing apparatus having tracking error detecting means for detecting a tracking error based on a read signal produced by opto-electrically transducing reflected light when an information reading beam is irradiated to a recording disk, and a tracking actuator for forcing said information reading beam to follow a recording track on the recording disk based on said tracking error, said tracking controller comprising:

error detecting means for calculating an error value between a read signal read from a recording track intended for reading and a predetermined value;

coefficient calculating means for calculating a first coefficient from a correlation between a first read signal read from a first adjacent recording track adjacent to said recording track intended for reading on the inner peripheral side of the disk and said error value, and for calculating a second coefficient from a correlation between a second read signal read from a second adjacent recording track adjacent to said recording track intended for reading on the outer peripheral side of the disk and said error value; and means for calculating a difference value between said first coefficient and said second coefficient as a tracking offset, and subtracting said tracking offset from said tracking error to correct the tracking offset.

2. A tracking controller according to claim 1, wherein said coefficient calculating means updates said first coefficient and said second coefficient such that said error value converges to zero.

3. A tracking controller in a recorded information reproducing apparatus having information reading means for reading recorded information from a recording disk based on a read signal produced by opto-electrically transducing reflected light when a reading beam is irradiated to said recording disk, tracking error detecting means for detecting a tracking error based on said read signal, and a tracking actuator for forcing said information reading beam to follow a recording track on said recording disk based on said tracking error, wherein a position read by said information reading means on a central recording track within three recording tracks adjacent to each other is referenced, said tracking controller comprising:

error detecting means for calculating an error value between a read signal read from said central recording track and a predetermined value;

a coefficient calculating means for calculating a first coefficient from a correlation between a read signal read from a radial position substantially identical to said read position on a first adjacent recording track adjacent to said central recording track on the inner peripheral side of the disk and said error value, and for calculating a second coefficient from a correlation between a read signal read from a radial position substantially identical to said read position on a second adjacent recording track adjacent to said central recording track on the outer peripheral side of the disk and said error value; and means for calculating a difference value between said first coefficient and said second coefficient as a tracking offset, and subtracting said tracking offset from said tracking error to correct the tracking offset.

4. A tracking controlling method of a recorded information reproducing apparatus comprising:

detecting a tracking error based on reflected light from a recording information disk when a reading beam is irradiated to the disk;

calculating an error value between a read signal read from a recording track intended for reading and predetermined value;

calculating a first coefficient from a correlation between said error value and a first signal read from a first recording track adjacent to said recording track intended for reading and on the inner peripheral side of the disk;

calculating a second coefficient from a correlation between said error value and a second signal read from a second recording track adjacent to said recording track intended for reading and on the outer peripheral side of the disk;

calculating a difference value between said first coefficient and said second coefficient as a tracking offset;

subtracting said tracking offset from said detected tracking error to obtain a corrected tracking error signal; and forcing the reading beam to follow a recording track on the disk based on said corrected tracking error signal.

5. The tracking controlling method according to claim 4, wherein said first and second coefficients are calculated by respectively updating said first coefficient and said second coefficient such that said error value converges to zero.

* * * * *